United States Patent [19]

Willetts

[11] Patent Number: 5,142,788

[45] Date of Patent: Sep. 1, 1992

[54] LASER COMPASS

[76] Inventor: Miles D. Willetts, 5654 Kilmore Crescent East, Surrey, Canada V3S 6G1

[21] Appl. No.: 702,595

[22] Filed: May 17, 1991

[51] Int. Cl.⁵ .................. G01B 11/26; G02B 7/14; G03B 21/28
[52] U.S. Cl. .................. 33/227; 33/DIG. 1; 33/27.01; 353/50
[58] Field of Search ............... 33/227, 228, DIG. 21, 33/27.01, 27.11; 353/42, 50, 98, 99, 15; 356/250; 362/259, 811, 86

[56] References Cited

U.S. PATENT DOCUMENTS

| | | | |
|---|---|---|---|
| 3,767,299 | 10/1973 | Fisher | 353/1 X |
| 3,951,527 | 4/1976 | Blanz | 353/98 X |
| 4,196,461 | 4/1980 | Geary | 353/50 |
| 4,693,567 | 9/1987 | Ozaki | |
| 4,799,103 | 1/1989 | Muckerheide | |
| 4,814,800 | 3/1989 | Lavinsky et al. | 353/50 |
| 4,852,265 | 8/1989 | Rando et al. | 33/227 |
| 4,861,189 | 8/1989 | Fukukawa et al. | |
| 4,912,851 | 4/1990 | Rando et al. | 33/227 |

FOREIGN PATENT DOCUMENTS 608007 11/1960 Canada .
693273 8/1964 Canada .

Primary Examiner—Harry N. Haroian
Attorney, Agent, or Firm—Barrigar & Oyen

[57] ABSTRACT

A laser compass projects a laser beam along an axis. A mirror is rotated within a rotation plane perpendicular to the axis. The mirror is pivotally adjusted relative to the axis of the laser beam to reflect the laser beam at an angle "α". As the mirror rotates, the reflected laser beam is swept through an inverted cone having an apex at the point of intersection of the laser beam with the mirror, and having a base on whatever projection surface happens to be located above the laser compass (typically, a ceiling). The base of the cone defines a perfect circle on the projection surface. The radius "r" of the circle is governed by the distance "d" between the projection surface and the intersection of the laser beam with the mirror; and, by the angle α. The mirror pivot angle α required to yield a circle of desired radius "r" is given by the formula:

$$\tan \alpha = r/d$$

The circle projected onto the projection surface may be used as a template to construct an accurate, curved pattern on the projection surface, or as an aid in the building of cylindrical or conical-shaped structures.

3 Claims, 3 Drawing Sheets

LASER COMPASS

FIELD OF THE INVENTION

This application pertains to apparatus which reflects a laser beam to project a circle of a desired diameter onto a surface such as a ceiling. The circle may be used as a template to construct an accurate, curved ceiling pattern, or as an aid in the building of cylindrical or conical-shaped structures.

BACKGROUND OF THE INVENTION

In building construction it is sometimes necessary to build in accordance with a curved pattern in a region which is difficult to work in. For example, interior designers or architects sometimes design ceilings, floors or entire buildings having curved features. Construction of a curved ceiling (for example) typically requires that curved segments be cut into the ceiling, or that curved projections be constructed to project downwardly from the ceiling. The designs are normally defined in terms of circles or arcs having prescribed radii.

There are several prior art techniques for constructing circular or curved ceilings. One prior art technique is to build a large mechanical compass capable of scribing circles or arcs of the desired radius. The compass is used to mark the prescribed circles or arcs on easily cut material such as paper, which is then cut into the required shape(s). The cut piece(s) are temporarily applied to the ceiling to serve as a guide to the construction of the required curved indentations and/or projections on the ceiling. If the room is not big enough to accommodate the mechanical compass then the marking and cutting is done in a warehouse or other space large enough to accommodate the compass. The cut pieces are transported to the job site, and applied to the ceiling as aforesaid. Canadian Patent No. 693,273 issued 25 Aug., 1964 for an invention of Michelle Quenot entitled "Instrument for Tracing Circles" discloses one type of mechanical compass capable of scribing large radius circles or arcs as aforesaid.

An alternative prior art technique for constructing circular or curved ceilings is to use a large mechanical compass to scribe the required circles or arcs onto the floor of the room in question. A plumb bob is then used to project points on the floor pattern up to the ceiling. The ceiling points are then connected, yielding the desired curved pattern on the ceiling. Workers then use the ceiling pattern as a guide to form the necessary curved indentations and/or projections on the ceiling.

The prior art techniques aforesaid are subject to a number of disadvantages. They require painstaking effort and accuracy which is difficult to achieve in a congested, cramped workspace such as a room undergoing construction. Accurate reproduction of the prescribed circular or curved ceiling design is typically a difficult, cumbersome, inefficient, labour-intensive, error-prone task. The present invention employs a laser to project a circle directly onto a ceiling. The diameter of the circle can easily be adjusted. The worker is thus rapidly and efficiently provided with an accurate reference on the ceiling itself, which serves as a guide to the accurate formation of complex curved projections and/or indentations on the ceiling with relative ease.

The invention also facilitates accurate, efficient construction of cylindrical or conical-shaped structures such as clarifiers, silos, hoppers and the like. It can be a difficult, time-consuming, cumbersome operation to ensure that the cylindrical (or conical) portions of such structures have a uniform circular cross-section (or a uniformly increasing or decreasing circular cross-section). By using the present invention to project circles of known, accurate diameter directly onto any desired portion of the structure during its construction, the construction supervisor may easily ensure that the required circular cross-section is maintained (or uniformly varied) throughout the construction project.

In the prior art, lasers have been used in building construction to produce reference lines on walls as an aid to accurate construction. For example, the Laser-Level TM device produced by Spectra-Physics Construction and Agricultural Division of Dayton, Ohio produces a pencil-thin beam of visible red laser light. The beam is rotated 360° to project a continuous, visible horizontal or vertical reference line on the walls of a room. The visual reference line may be aligned with any desired reference, and may be used as a guide for the installation of acoustical ceilings, computer floors, raised access flooring, partitions, drywall, etc. However, no provision is made for redirecting the beam to yield a pattern such as a circle on a wall, floor or ceiling.

The prior art discloses various techniques for using light sources to illuminate patterns as a guide to construction. Canadian Patent No. 608,007 issued 1 Nov., 1960 for an invention of Slater et al. entitled "Method and Means for Marking Out Work" uses an optical system to project light through a patterned template to produce an enlarged shadow on a workpiece. The shadow serves as a guide to construction. This technique requires painstaking effort in reducing the size of the pattern and accurately cutting the template.

U.S. Pat. No. 4,693,567 issued 15 Sept., 1987 for an invention of Yasuto Ozaki entitled "Apparatus for Projecting Luminous Lines on an Object by a Laser Beam" employs a pair of convex and concave lenses together with a specially shaped reflector to deflect a laser beam onto a surface, yielding a pattern governed by the shape of the reflector. A drawback of Ozaki's device is that different reflectors are apparently required to yield different patterns. Accordingly, Ozaki's device seems to be restricted, as a practical matter, to use in situations in which the effort and expense of constructing a special reflector can be justified.

SUMMARY OF THE INVENTION

In accordance with the preferred embodiment, the invention provides a laser compass having a laser light source for projecting a laser beam along an axis, a mirror, mirror rotating means for rotating the mirror within a rotation plane perpendicular to the axis; and, mirror pivoting means for pivoting the mirror relative to the axis.

The mirror rotating means may comprise a rotatable mirror support, first and second mirror support arms projecting upwardly from the mirror support, and drive means for rotatably driving the mirror support.

The mirror pivoting means preferably comprises a link member projecting through the mirror support, pivotal coupling means for pivotally coupling one end of the link member to the mirror, securing means for pivotally securing the mirror between the support arms, and adjusting means coupled through the mirror support to an opposed end of the link member for adjustably displacing the link member relative to the mirror.

The adjusting means may advantageously comprise a worm gear coupled to the link member, a first bevel gear rotatably coupled to the worm gear, a second bevel gear rotatably engaged with the first bevel gear, and manual rotation means coupled to the second bevel gear.

Adjustable levelling means may be provided for adjusting the angle between the rotation plane and the axis to maintain the rotation plane perpendicular to the axis.

The invention also provides a method of tracing a circle of radius "r" on a surface. A laser beam is projected along an axis onto a mirror located at a distance "d" from the surface. The mirror is pivoted at an angle "α" relative to the axis of the laser beam. The mirror is then rotated within a rotation plane perpendicular to the laser beam's axis and parallel to the surface on which the circle is to be traced. The pivot angle "α" may be adjusted, which will in turn vary the radius "r" of the traced circle, in accordance with the formula:

$$\tan \alpha = r/d$$

DETAILED DESCRIPTION OF THE PREFERRED EMBODIMENT

Figure 1:
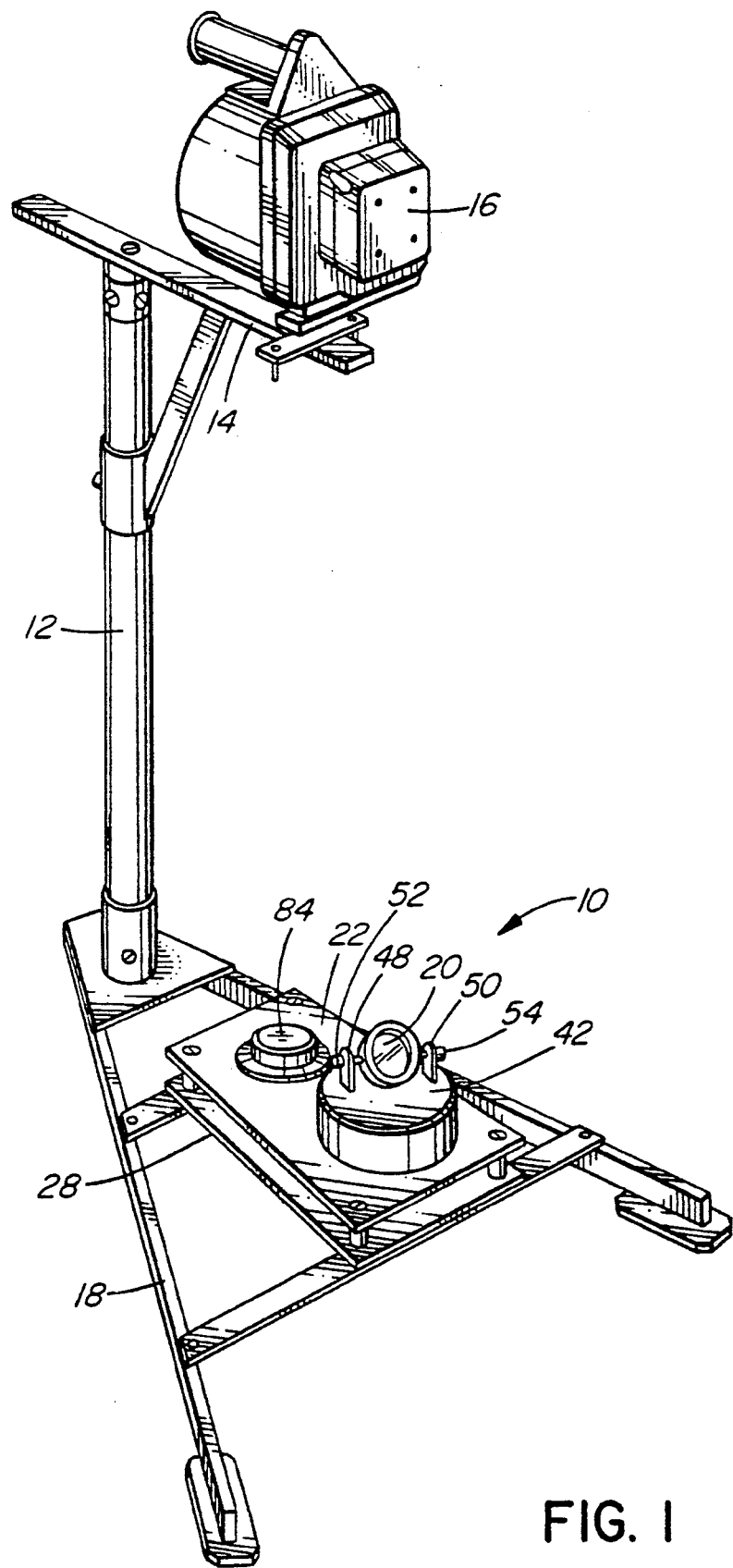
FIG. 1 is a pictorial illustration of a laser compass constructed in accordance with the preferred embodiment of the invention.

FIG. 1 illustrates a laser compass 10 having a pedestal 12 with an upper bracket 14 capable of removably supporting a suitable laser light source 16 and a lower bracket 18 which rests on the floor. Laser light source 16 may be a Laserlevel TM model 1142XL device available from Spectra-Physics Construction and Agricultural Division of Dayton, Ohio. Laser light source 16 is securely fastened to upper bracket 14 by means of removable bolts or other suitable fasteners. Laser light source 16 is then adjusted so that, instead of producing a laser beam which is rotated 360° around device 16 (which is the typical purpose of the device), the laser beam projects vertically downward onto rotatable mirror 20.

Mirror 20 is supported on platform 22, which is fastened atop lower bracket 18. Suitable adjustable fasteners are used to interconnect platform 22 with lower bracket 18 so that the position of platform 22 may be incrementally adjusted to ensure that platform 22 is level. A spirit level 24 (FIG. 2) is provided on platform 22 for use as a reference during the levelling operation. The aforementioned LaserLevel TM light source is self-levelling.

A drive means such as electric motor 26 is mounted on sub-platform 28 beneath platform 22. The drive shaft of motor 26 is coupled, by pulley 30 and drive belt 32, to drive member 34 which is rotatably supported on main shaft 36 by bearings 38. The upper end of drive member 34 is fastened to the base 40 of a rotatable mirror support such as drum 42, which projects through aperture 44 in platform 22. The lower end 46 of main shaft 36 is fixed to sub-platform 28. Main shaft 36 projects upwardly through and rotatably supports drive member 34 and drum 42.

A pair of parallel support arms 48, 50 (FIG. 1) project upwardly from the top of drum 42. (Support arms 48, 50 are not shown in FIG. 2, to avoid obscuring details of the mirror pivot mechanism hereinafter described). Mirror 20 is held between the upper ends of support arms 48, 50 by adjustable set screws 52, 54 which are tightened sufficiently to prevent lateral movement of mirror 20, while accommodating pivotal adjustment of mirror 20 as hereinafter explained. A counterweight 55 may be affixed to the underside of drum 42 to counterbalance the mirror and its support assembly during rotation. Mirror 20 is preferably silvered on its front face.

The upper end of one arm 56 (FIG. 2) of a pivotal link mechanism is fastened to the underside of mirror 20. The lower end of arm 56 is pivotally connected, via pivot pin 58, to the upper end of the other arm 60 of the link mechanism. The lower end of arm 60 rotates within ball race 61 fitted into the upper end of riser 62, which is slidably mounted in the upper end of longitudinal aperture 64 of main shaft 36. The upper end of push rod 66 projects into a mating recess 68 provided at the lower end of riser 62. Push rod 66 is connected to riser 62.

Gear teeth are cut into the lower end 68 of push rod 66. Mating gear teeth are provided on worm gear 70, which meshes with the geared lower end 68 of push rod 66. A first indexing shaft 72 supported on bushings 74, 76 is coupled between worm gear 70 and first bevel gear 78. A second bevel gear 80 meshes, at right angles, with first bevel gear 78. A second indexing shaft 82 is coupled between second bevel gear 80 and a manual rotation means, such as indexing dial 84.

The pivot angle "α" of mirror 20 is adjusted by manual rotation of indexing dial 84. More particularly, rotation of dial 84 causes corresponding rotation of second indexing shaft 82 and second bevel gear 80, which rotatably drives first bevel gear 78 in the opposite direction, thereby rotating first indexing shaft 72 and worm gear 70. Rotation of worm gear 70 drives the geared lower end of push rod 66 upwardly or downwardly, depending upon the direction of rotation of dial 84.

When push rod 66 is driven upwardly, it slidably displaces riser 62 upwardly, which in turn displaces link arm 60 upwardly. Mirror 20 is held in place by support arms 48, 50 and set screws 52, 54 which together prevent upward displacement of mirror 20. Set screws 52, 54 do however accommodate pivotal movement of mirror 20. Accordingly, upward motion of link arm 60 causes pivotal displacement of link arm 56 about pin 58. Mirror 20, being fastened to link arm 56, pivots therewith. As previously mentioned, push rod 66 is connected to riser 62. Accordingly, when push rod 66 is driven downwardly, push rod 66 pulls riser 62 downwardly. It can thus be seen that manual adjustment of dial 84 facilitates adjustment of the pivot angle α of mirror 20. Moreover, it will be noted that such adjustment may be made while mirror 20 is rotating, as hereinafter explained.

In operation, motor 26 is electrically coupled to a suitable power source. When motor 26 is energized it drives pulley 30 and belt 32 which in turn rotates drive member 34 and drum 42. Mirror support arms 48, 50 rotate with drum 42. Since mirror 20 is held between support arms 48, 50 it too rotates with drum 42. Link arms 56, 60 rotate with mirror 20. Rotation of link arm 60 is accommodated by ball race 61. Main shaft 36, riser 62 and push rod 66 do not rotate.

Figure 2:
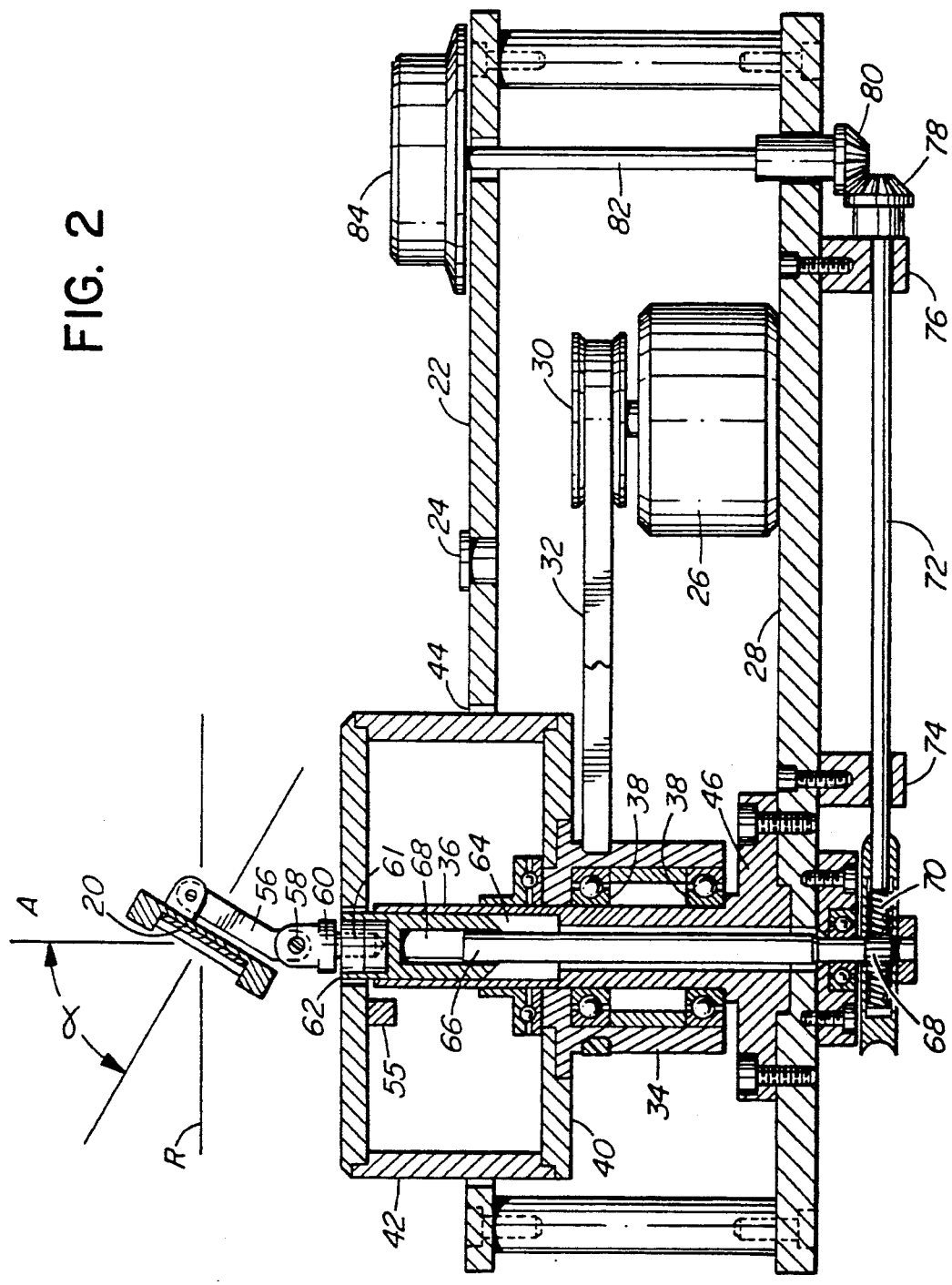
FIG. 2 is a partially fragmented side elevation view of the rotatable mirror assembly of the preferred embodiment.
Figure 3:
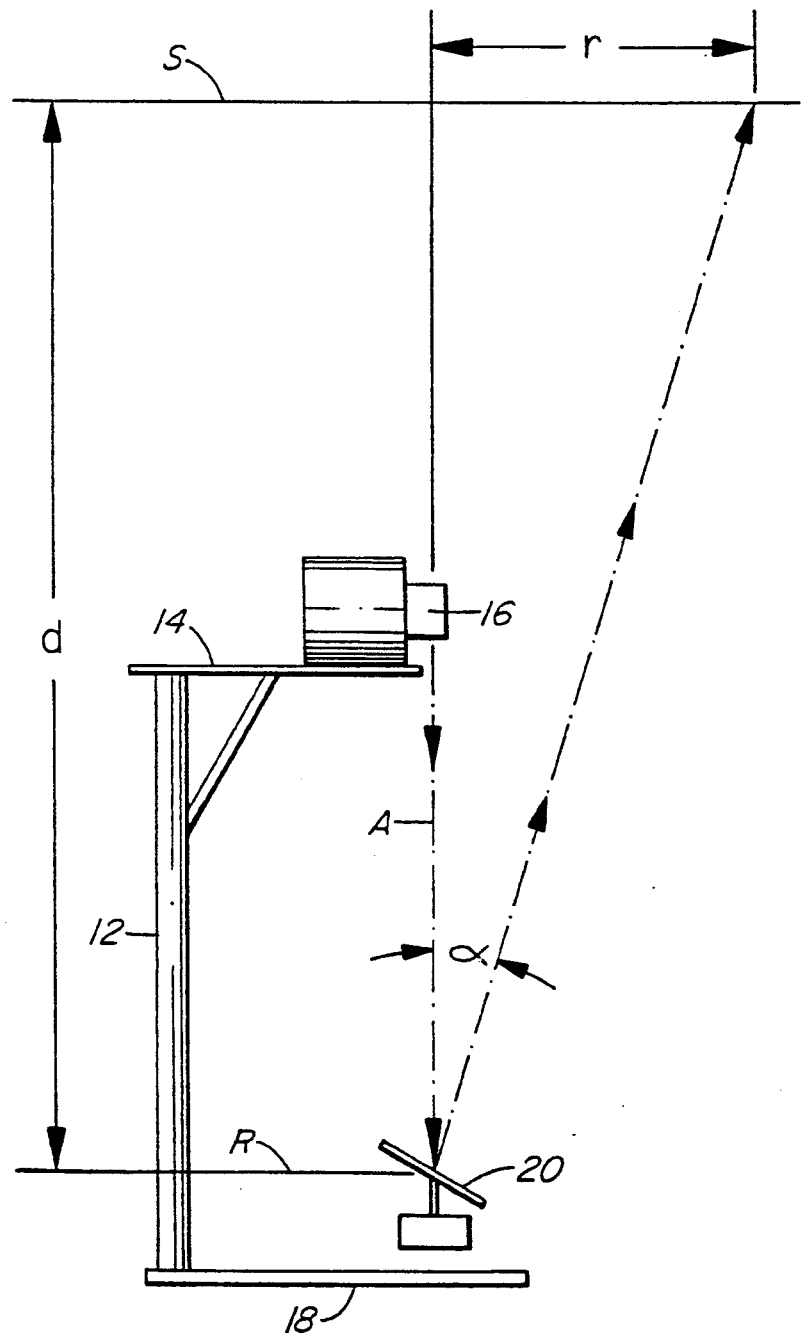
FIG. 3 is a simplified schematic illustration of the geometric relationships which define circles scribed with the aid of the invention.

Laser light source 16 is energized in conventional fashion to direct a laser beam downwardly along axis "A" onto mirror 20. The laser beam strikes mirror 20, which is pivotally adjusted as aforesaid to reflect the laser beam at an angle "α" as depicted in FIGS. 2 and 3. As mirror 20 rotates within a rotation plane "R" perpendicular to axis "A", the reflected laser beam is swept through an inverted cone having an apex at the point of intersection of the laser beam with mirror 20, and having a base on whatever projection surface "S" happens to be located above laser compass 10 (typically, a ceiling, or the walls of a cylindrical or conical-shaped structure).

Presupposing projection surface "S" to be a ceiling parallel to platform 22, it will be understood that the base of the aforementioned cone defines a perfect circle on the ceiling. In the case of a cylindrical or conical-shaped structure, the projection surface will occur at a notional cross-sectional plane which intersects the walls of the structure and which is parallel to platform 22. The aforementioned cone will also define a perfect circle on this projection surface; that is, on the inner walls of the cylindrical or conical-shaped structure. The radius "r" of the circle is governed, as illustrated in FIG. 3, by the distance "d" between projection surface "S" and the intersection of the laser beam with mirror 20; and, by the angle α. More particularly, the mirror pivot angle α required to yield a circle of desired radius "r" is given by the formula:

$$\tan \alpha = r/d$$

Motor 26 rotated at a speed sufficient to give an observer the impression that the reflected laser beam traces a continuous circle on the projection surface. If desired, the speed of motor 26 may be varied. This would be useful, for example, in situations in which the ambient lighting is relatively high. By reducing the speed of rotation of mirror 20, one may increase the luminous intensity of the circle projected onto the projection surface, thereby making it easier to perceive the circle in high ambient light conditions. Similarly, by increasing the speed of rotation of the mirror in lower ambient light conditions, one may improve the perceived solidity of the circle traced on the projection surface as the reflected laser beam as it is swept through a cone as aforesaid.

As will be apparent to those skilled in the art in the light of the foregoing disclosure, many alterations and modifications are possible in the practice of this invention without departing from the spirit or scope thereof. For example, the projection surface may be a ceiling, a floor, or the wall of a cylindrical or conical building. If the projection surface is a floor, the relative positions of laser light source 16 and the mirror assembly may be reversed, such that laser light source 16 directs the laser beam upwardly onto mirror 20 which in turn reflects the beam downwardly onto a lower projection surface (such as a floor). It will also be understood that the invention may be used to trace non-circular designs such as ellipses by suitably varying the angle at which the laser beam strikes the mirror. Accordingly, the scope of the invention is to be construed in accordance with the substance defined by the following claims.

What is claimed is:

1. A laser compass comprising:
   (a) a laser light source for projecting a laser beam along an axis;
   (b) a mirror;
   (c) mirror rotating means for rotating said mirror within a rotation plane perpendicular to said axis, said mirror rotating means comprising:
      (i) a rotatable mirror support;
      (ii) first and second mirror support arms projecting upwardly from said mirror support;
      (iii) drive means for rotatably driving said mirror support; and,
   (d) mirror pivoting means for pivoting said mirror relative to said axis, said mirror pivoting means comprising:
      (i) a link member projecting through said mirror support;
      (ii) pivotal coupling means for pivotally coupling one end of said link member to said mirror;
      (iii) securing means for pivotally securing said mirror between said support arms; and
      (iv) adjusting means coupled through said mirror support to an opposed end of said link member for adjustably displacing said link member relative to said mirror.

2. A laser compass as defined in claim 1, wherein said adjusting means comprises:
   (a) a worm gear coupled to said link member;
   (b) a first bevel gear rotatably coupled to said worm gear;
   (c) a second bevel gear rotatably engaged with said first bevel gear; and
   (d) manual rotation means coupled to said second bevel gear.

3. A laser compass as defined in claim 2, further comprising adjustable levelling means for adjusting the angle between said rotation plane and said axis to maintain said rotation plane perpendicular to said axis.

* * * * *